J. G. DETTINGER, Jr. & F. H. WELKER.
ARTIFICIAL TOOTH.
APPLICATION FILED FEB. 15, 1915.
1,181,975.
Patented May 2, 1916.
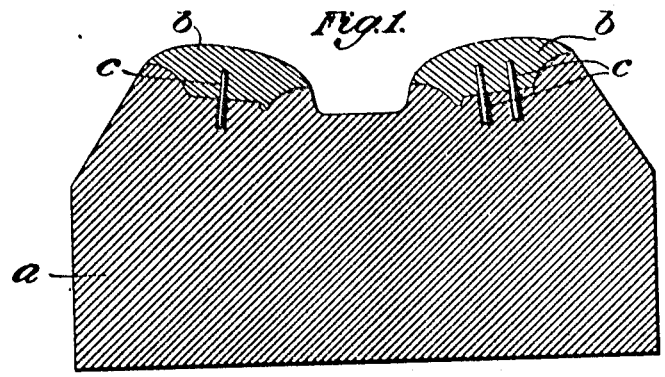
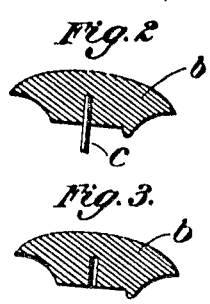
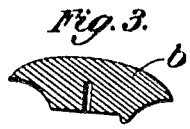
Attest:
E. M. Hamilton
Bessie L. Bishop
Inventors:
John G. Dettinger Jr. &
Frank H. Welker
THE COLUMBIA PLANOGRAPH CO., WASHINGTON, D. C.

UNITED STATES PATENT OFFICE.

JOHN G. DETTINGER, JR., AND FRANK H. WELKER, OF PHILADELPHIA, PENNSYLVANIA.

ARTIFICIAL TOOTH.

1,181,975.

Specification of Letters Patent.

Patented May 2, 1916.

Application filed February 15, 1915. Serial No. 8,337.

*To all whom it may concern:*

Be it known that we, JOHN G. DETTINGER, Jr., and FRANK H. WELKER, citizens of the United States, residing at Philadelphia, Pennsylvania, have invented certain new and useful Improvements in Artificial Teeth, of which the following is a specification.

It is the purpose of our invention to provide a simple and effective method for securing the holding pins used in artificial teeth.

In carrying out our invention, we mold the tooth into the proper form and in a proper mold and with the process of molding we embed one or more pins loosely fitted to the mold so as to come away with the teeth and while the teeth are in the mold they are subjected to a drying or baking heat, which changes the putty-like nature of the material of which the tooth is made to a chalky form, known in the trade as "biscuit." In this form after being removed from the mold the teeth have the pins embedded in them and the pins are withdrawn as they come away readily under slight pressure and leave recesses, the pins simply being utilized for the purpose of making the recesses.

It is our aim to practise the greatest economy in the production of teeth with our improved holding means for it is necessary to use expensive materials, such as platinum and gold and as is well known, the articles worked upon are of small size and the recesses left by the pins are also very small, being about 49/1000 of an inch in diameter.

It is very essential that a strong holding connection be secured for the teeth and to this end, it is necessary that the soldered connection which we make between the platinum anchor plate and the metal pin be perfect and as strong as possible and that every bit of the contacting surfaces be made to hold perfectly.

We have found that if the platinum plate is inserted at the time the tooth is molded, the material of the tooth over-runs the surface of the plate and thus prevents perfect contact with the pin end and the surfaces are so small that this is a very serious matter. Hence we have, in order to overcome this difficulty, molded the tooth first with the recess forming pins and then after the tooth has been dried out into chalky or biscuit form remove these pins, furnishing a clean recess with the material sufficiently hard as to avoid all danger of falling upon or making possible imperfect contact with the holding means. At this step we insert a disk of platinum which accurately fits the recess and is of a diameter of about 49/1000th of an inch, and the next step is to take the biscuit form of tooth, which it will be remembered is of a chalky nature and has only been dried out in the mold and this is then subjected to a burning temperature in a furnace to a fusing heat, which transforms the biscuit or dried chalky material to a hard stony or glassy form commonly known as porcelain. In this burning step the material of the biscuit tooth shrinks one-fifth which has the effect of reducing the diameter of the recess and shrinks the wall thereof around the platinum disk, thus embedding the disk permanently within the tooth and yet leaving the plate exposed at the bottom of the recess perfectly clean and furnishing a contacting and holding surface equal to the full diameter of the recess. The next step is to insert the solder disk within the recess after the burned tooth is ready for further treatment and then the metal holding pin is dipped into a proper soldering fluid and inserted in the recess and pressed into contacting connection with the solder disk, which in turn is in close contact with the platinum disk and the parts are fused together by the application of heat. It will thus be seen that we do not embed our holding pins in the teeth at the time of molding as has been heretofore done and by pursuing the process above described we are enabled to secure the most perfect results with a minimum amount of platinum, which as is well known is an expensive material.

Our experience has shown us that it is necessary to follow the steps outlined above to secure the desired results.

In the accompanying drawing, we have shown the various steps in carrying out our method and to produce the finished article also of our invention.

The figures are largely diagrammatic but will give a very clear idea of the steps as they follow one another.

In Figure 1, is shown a section of the mold with the material of which the tooth is molded in place and also the recess forming pin in position in the mold and the molded material. Fig. 2 shows the tooth removed from the mold with the recess forming pin attached. Fig. 3 shows the tooth with the recess forming pin removed. Fig. 4 shows the tooth with the platinum disk in place. Fig. 5 shows the tooth after it has been subjected to a white heat in the furnace which transforms it from a chalky-like material to a porcelain nature and between these two steps a shrinking of one-fifth has taken place, which by reducing the diameter of the recess draws the walls thereof over the edges of the platinum disk. Fig. 6 shows the tooth with the solder disk inserted in the recess. Fig. 7 shows the pin inserted, and Fig. 8 the finished tooth.

In Fig. 1 the mold is shown at $a$ and the material of which the tooth is molded at $b$, the recess forming pin being shown at $c$ and this fits loosely in a recess in the mold so that it will come away with the tooth after the molding operation has been completed, which it will be understood includes the application of heat to the mold to dry out the tooth material or bake the same into what is known as the biscuit condition, whch leaves the material in a chalky state. As soon as the tooth has been removed from the mold the pin or pins which adhere to it are withdrawn, which leaves the clean recess, as shown in Fig. 3. Into this recess, as shown in Fig. 4, is inserted the platinum disk $d$ and then the biscuit tooth is placed in the furnace and subjected to a fusing heat, which transforms the chalky-like material to a porcelain material, Fig. 5 showing the tooth after it has been thus burned or fused, which action, as has been stated, causes a shrinkage of about one-fifth and reduces the size of the recess accordingly. A disk of solder $e$ is then inserted in the recess, as in Fig. 6, and the metal holding pin $f$, shown in Fig. 7, after being dipped into a soldering solution is then inserted in the recess in contact with the solder disk, which is in close contact in turn with the platinum disk and by the application of heat and pressure the parts are securely fastened together, resulting in an article in which the pin has the most secure and perfect connection with the tooth at the very minimum cost of operation.

While we have described the withdrawal of the tooth from the mold and then removing the recess forming pin, we do not wish to limit ourselves to this particular step as the recess forming pin may be made a permanent part of the mold and when the tooth is withdrawn from the mold it would leave the pin behind and the recess formed by the pin would be ready for the insertion of the platinum disk and we wish it to be understood that our claims are broad enough to cover this change.

It is customary to use two pins in the teeth to prevent movement and to form a firm anchorage, as shown to the right of Fig. 1 and it will be observed that the recesses are so close together as to form a very thin web between the holding pins after shrinkage has taken place, which leaves a very small space for the anchoring disks and it is therefore absolutely necessary that these disks be very little larger than the opening so as not to destroy the intervening web or to lessen the strength of this web any more than is necessary, as this would naturally tend to lessen the strength of the whole structure.

What we claim is:

1. The method herein described, which consists in molding a tooth with a recess forming pin, the molded tooth being subjected to heat to dry out the material; then withdrawing the tooth from the mold; inserting a platinum disk in the recess left by the pin forming the same; burning the tooth to transform it from a chalky to a porcelain nature causing a shrinkage of the material to anchor the platinum disk in place and then soldering the holding pin to the platinum, substantially as described.

2. As an article of manufacture, an artificial tooth having a round anchor plate in the bottom of a pin opening of slightly larger diameter than said opening so as to be held in place by the overhanging walls of the opening and a pin soldered to the said anchor plate.

In testimony whereof, we affix our signatures in presence of two witnesses.

JOHN G. DETTINGER, JR.
FRANK H. WELKER.

Witnesses:
FRED. FRANK, JR.,
LOUIS BRUESOLE.

Copies of this patent may be obtained for five cents each, by addressing the "Commissioner of Patents, Washington, D. C."